US006662640B2

(12) United States Patent
Yagi

(10) Patent No.: US 6,662,640 B2
(45) Date of Patent: Dec. 16, 2003

(54) AIR AMOUNT DETECTOR FOR INTERNAL COMBUSTION ENGINE

(75) Inventor: Toyoji Yagi, Anjo (JP)

(73) Assignee: Denso Corporation, Kariya (JP)

( * ) Notice: Subject to any disclaimer, the term of this patent is extended or adjusted under 35 U.S.C. 154(b) by 137 days.

(21) Appl. No.: 09/977,308

(22) Filed: Oct. 16, 2001

(65) Prior Publication Data

US 2002/0107630 A1 Aug. 8, 2002

(30) Foreign Application Priority Data

Oct. 19, 2000 (JP) ....................................... 2000-324677

(51) Int. Cl.[7] ............................................... G01M 15/00
(52) U.S. Cl. ...................................... 73/118.2; 73/118.2
(58) Field of Search ................................ 73/115, 117.3, 73/118.2, 706, 861, 861.02, 866.03, 861.42; 123/339, 420, 450, 488, 489, 492, 494

(56) References Cited

U.S. PATENT DOCUMENTS

| | | | | |
|---|---|---|---|---|
| 4,974,563 A | * 12/1990 | Ikeda et al. | ................. | 123/494 |
| 5,408,872 A | * 4/1995 | Nonaka | ..................... | 13/118.2 |
| 6,334,083 B1 | * 12/2001 | Aono et al. | ................. | 701/102 |

FOREIGN PATENT DOCUMENTS

| | | |
|---|---|---|
| JP | 63-1732 | 1/1988 |
| JP | 7-243344 | 9/1995 |
| JP | 8-62012 | 3/1996 |

* cited by examiner

*Primary Examiner*—Kamand Cuneo
*Assistant Examiner*—Monica D. Harrison
(74) *Attorney, Agent, or Firm*—Nixon & Vanderhye, PC

(57) ABSTRACT

A response delay compensation element for compensating a response delay of an output $g_{MAF}$ of an airflow meter by a phase advance compensation is provided so that an output g of the response delay compensation element is input to the intake air system model. A transfer function of the phase advance compensation is $$g=(1+T_1 \cdot s)/(1+T_2 \cdot s) \cdot g_{MAF}$$

where $T_1$ and $T_2$ are time constant of the phase advance compensation, which is set based on at least one of the output $g_{MAF}$ of the airflow meter, engine speed, an intake air pressure, and a throttle angle. The model time constant $\tau_{IM}$ of the intake air system model is calculated by variables including volumetric efficiency and the engine speed. The volumetric efficiency is calculated by two-dimensional map having the engine speed and the intake air pressure as parameters thereof.

15 Claims, 9 Drawing Sheets

AIR AMOUNT DETECTOR FOR INTERNAL COMBUSTION ENGINE

CROSS REFERENCE TO RELATED APPLICATION

This application is based on and incorporates herein by reference Japanese Patent Application No. 2000-324677 filed on Oct. 19, 2000.

BACKGROUND OF THE INVENTION

1. Field of the Invention

The present invention relates to an air amount detector for an internal combustion engine, which detects a flow amount of intake air and calculates an air amount inside cylinder.

2. Description of Related Art

In general, methods for measuring an air amount inside cylinder of an engine are classified broadly in two schemes: One is a method in which an intake air flow is detected by an airflow meter, and then the air amount inside cylinder is calculated based on the detected value (hereinafter referred to as a mass-flow system); and the other is a method in which an intake air pressure is detected by an intake air pressure sensor, and then the air amount inside cylinder is calculated based on the intake air pressure and rotation speed of the engine (hereinafter referred to as a speed-density system). The mass flow system has an advantage of having a measurement accuracy of the air amount inside cylinder under a steady state because the intake air flow equals the air amount inside cylinder under the steady state. However, during a transient period, a response of the airflow meter delays (e.g., in a case of a thermo airflow meter, a response is delayed due to the heat mass of a sensor portion of the airflow meter itself). Thus, the massflow system has a disadvantage of an undesirable response during the transient period.

On the contrary, the speed-density system has better response during the transient period than the massflow system has. This is due to a high response of an intake air pressure sensor.

In view of the above, a system that combines two sensors having advantages of the massflow system and the speed-density system has been developed recently. The two-sensor combination system uses an airflow meter and an intake air pressure sensor provided therein so that the air amount inside cylinder is calculated based on the intake air flow detected by the airflow meter during the steady period while it is calculated based on the engine speed and the intake air pressure detected by the intake air pressure sensor.

In the above-described two-sensor combination system, the air amount inside cylinder is calculated based on the engine speed and the intake air pressure detected by the intake air pressure sensor. However, the air amount inside cylinder changes by depending not only on the intake air pressure, but also on volumetric efficiency and an intake air temperature, so that a calculation result of the air amount inside cylinder may have a margin of error due to an influence of a detection error or the like. There is an increasing demand for an engine developed in recent years to have a fuel-air ratio controller of high precision in order to deal with an exhaust gas cleaning regulation. In order to achieve such demand, it is necessary to improve the calculation accuracy of the air amount inside cylinder.

SUMMARY OF THE INVENTION

An object of the present invention is to provide an air amount inside cylinder detector for an internal combustion engine that enables to improve the calculation accuracy of the air amount inside cylinder.

According to the present invention, a response delay of an intake air flow detection means for detecting a air flow of the intake air flowing in an intake air passageway of the internal combustion engine is compensated by response delay compensation means. An intake air system model is used for modeling a behavior of an intake air which passes through a throttle valve and flows into cylinders, so that an output of the response delay compensation means is input to the intake air system model to calculate an output of the intake air system model as an air amount inside cylinder by a calculation means. In this case, because the response delay compensation means for compensating the response delay of the intake air flow detection means is provided, it is possible to calculate the air amount inside cylinder from a detection value of the intake air flow amount even during the transient period with a desirable response, thereby enabling to improve calculation accuracy of the air amount inside cylinder.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENT

An embodiment according to the present invention applied to an engine with an intake/exhaust variable valve timing mechanisms will be described.

Figure 1:
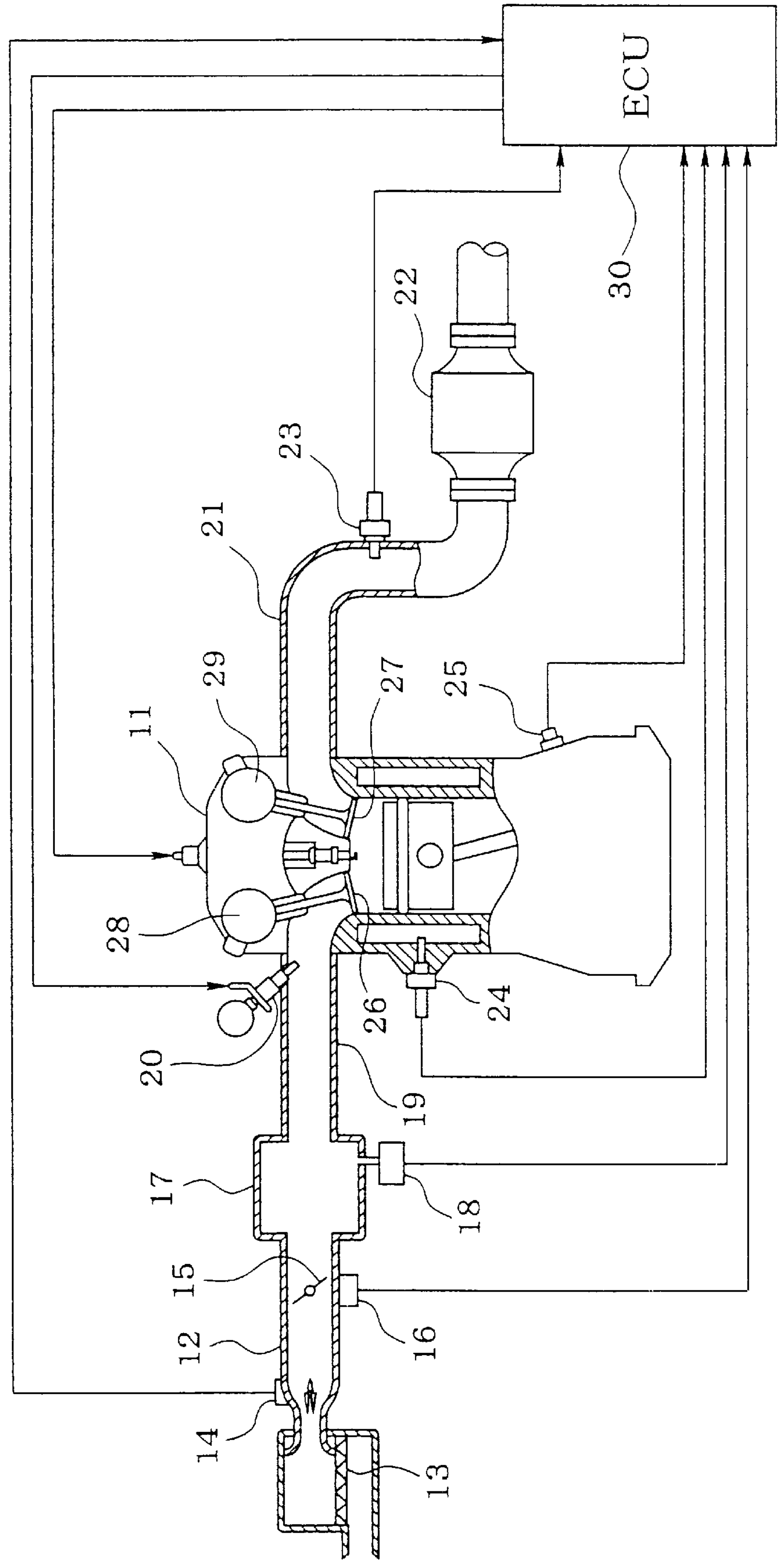
FIG. 1 is a schematic view showing an engine control system.

A general structure of an entire engine control system will be described with reference to FIG. 1. At a most upstream side of an intake pipe 12 (intake air passage) of an engine 11, an air cleaner 13 is provided. At a downstream side of the air cleaner 13, a thermal airflow meter 14 (an intake air flow amount detection means) for detecting an intake air flow is provided. The airflow meter 14 has a heat wire (not illustrated) disposed in the intake air flow and an intake air temperature detection element (not illustrated) housed therein, so that supply current to the heat wire is controlled so as to keep a constant temperature difference between a temperature of the heat wire cooled by the intake air and a temperature of the intake air. Accordingly, the supply current to the heat wire changes corresponding to a heat radiation amount of the heat wire which changes with respect to the intake air flow amount, and a voltage signal corresponding to the supply current is output as an intake air flow amount signal. At a downstream side of the airflow meter 14, a throttle valve 15 and a throttle opening sensor 16 for detecting a throttle opening degree are provided.

At a downstream side of the throttle valve 15, a surge tank 17 is provided. The surge tank 17 includes an intake air pressure sensor 18 (an intake air pressure detection means) for detecting an intake air pressure P. Further, the surge tank 17 includes an intake manifold 19 for introducing the air into each cylinder of the engine 11. In the vicinity of an intake port of the intake manifold 19 of each cylinder, a fuel injection valve 20 for injecting the fuel is attached. An intake valve 26 and an exhaust valve 27 are driven by variable valve timing mechanisms 28, 29, respectively, so as to adjust intake/exhaust valve timing (VVT angle θ) corresponding to a driving state of the engine. The variable valve timing mechanisms 28, 29 may be driven either hydraulically or electromagnetically.

At an intermediate point of an exhaust pipe 21 of the engine 11, a catalyst 22 such as a three way catalyst for clearing the exhaust gas is placed. At an upstream side of the catalyst 22, an air-fuel ratio sensor (or an oxygen sensor) 23 for detecting an air-fuel ratio (or an oxygen density) of the exhaust gas is provided. To a cylinder block of the engine 11, a cooling water temperature sensor 24 is attached for detecting a cooling water temperature, a crank angle sensor 25 for detecting an engine speed Ne.

These various sensor outputs are input to an engine controlling unit (hereinafter referred to as "ECU") 30. The ECU 30 is composed mainly of a microcomputer. By executing each routine for fuel injection control shown in FIGS. 4–11, which is stored in a built-in ROM (storage medium), it functions as a calculating means for calculating an air amount inside cylinder $g_C$ by using an intake air system model, and sets the fuel injection amount corresponding to the air amount inside cylinder $g_C$.

The intake air system model used for the calculation of the air amount $g_C$, is a model of the behavior of the intake air flowing in the intake passageway from the throttle valve 15 to an inlet of the engine 11 (hereinafter referred to as "throttle downstream intake passageway"), and is derived from law of "conservation of mass" and "gas equation" as described below.

When the law of "conservation of mass" is applied to the flow of the intake air in the throttle downstream intake air passageway, a relationship as expressed by the following equation (1) can be obtained:

$$d/dt \cdot G_{IM} = g - g_C \tag{1}$$

where $G_{IM}$ is an air mass within the throttle downstream intake air passageway, $d/dt \cdot G_{IM}$ is an amount of change in the air mass within the throttle downstream intake air passageway, g is an amount of air passing through the throttle (an air amount passing through the throttle valve 15), and $g_C$ is the air amount inside cylinder.

Moreover, when the "gas equation" is applied to the throttle downstream intake air passageway, the following equation (2) an be obtained:

$$g_C = \eta \cdot Ne/2 \cdot V_C \cdot \rho_{IM} \tag{2}$$

where η is volumetric efficiency, Ne is an engine speed, $V_C$ is a cylinder volume, and $\rho_{IM}$ is an air density within the throttle downstream intake air passageway.

Here, because the volumetric efficiency η changes due to the intake air flow amount, it is set based on the intake air pressure P and the engine speed Ne that is a parameter correlative to the intake air flow amount.

$$\eta = f(Ne, P)$$

The air density $\rho_{IM}$ within the throttle downstream intake air passageway is obtained by dividing the air mass $G_{IM}$ within the throttle downstream intake air passageway by the volume $V_{IM}$ within the throttle downstream intake air passageway.

$$\rho_{IM} = G_{IM}/V_{IM} \tag{3}$$

A model time-constant $\tau_{IM}$ of the intake air system model can be expressed as the following equation (4):

$$\tau_{IM} = 2 \cdot V_{IM}/(V_C \cdot \eta \cdot Ne) \tag{4}$$

From the above-mentioned equations (1)–(4), the following equations (5) and (6) can be derived.

$$g_C = G_{IM}/\tau_{IM} \tag{5}$$

$$d/dt \cdot G_{IM} = g - G_{IM}/\tau_{IM} \tag{6}$$

By using Laplace transform to the above-mentioned equation (6), a transfer function of the intake air system model as expressed in the following equation (7) can be obtained.

$$g_C = 1/(1 + \tau_{IM} \cdot S) \cdot g \tag{7}$$

The throttle passing air amount g as an input of the intake air system model uses an output $g_{MAF}$ of the airflow meter 14. However, there is a response delay for the output $g_{MAF}$ of the airflow meter 14, and therefore, if the output $g_{MAF}$ of the airflow meter 14 is used as an input of the intake air system model, a calculation error for the intake air system model output (air amount $g_C$) during the transient period becomes too large to secure sufficient calculation accuracy.

Figure 2:
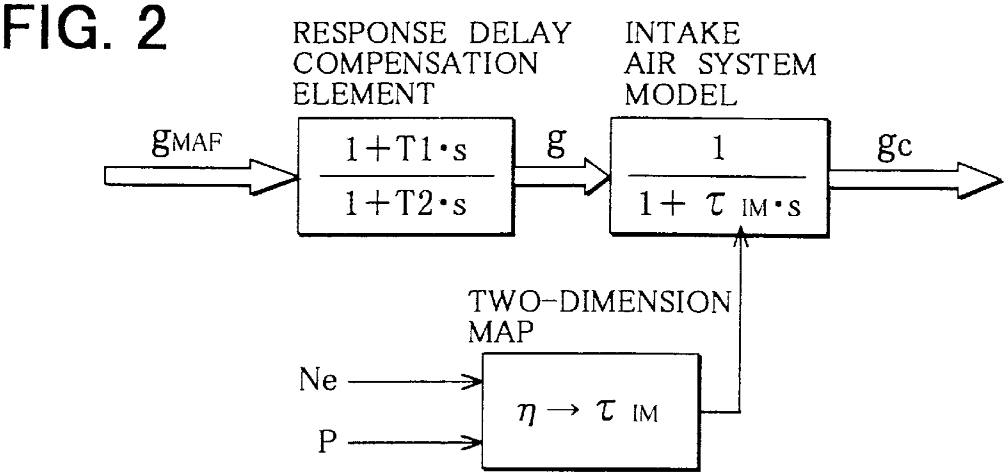
FIG. 2 is a block diagram showing an air amount inside cylinder calculation model.

In view of the above, in the present embodiment, as shown in FIG. 2, on an input side of the intake air system model, there is provided a response delay compensation element (a response delay compensation means) for compensating the response delay of the output $g_{MAF}$ of the airflow meter 14 by way of a phase advance compensation. An output g of the response delay compensation element is input to the intake air system model. A transfer function of the response delay compensation element (phase advance compensation element) is expressed as the following equation (8):

$$g = (1 + T_1 \cdot s)/(1 + T_2 \cdot s) \cdot g_{MAF} \tag{8}$$

where $T_1$ and $T_2$ are time constant of the phase advance compensation, which is set based on at least one of the output $g_{MAF}$ of the airflow meter 14, the engine speed Ne, the intake air pressure P, and the throttle angle.

The model time constant $\tau_{IM}$ of the intake air system model expressed by the equation (7) is calculated by the equation (4) of which variables are the volumetric efficiency $\eta$ and the engine speed Ne. The volumetric efficiency $\eta$ is calculated by two-dimensional map having the engine speed Ne and the intake air pressure P as parameters thereof.

Figure 12:
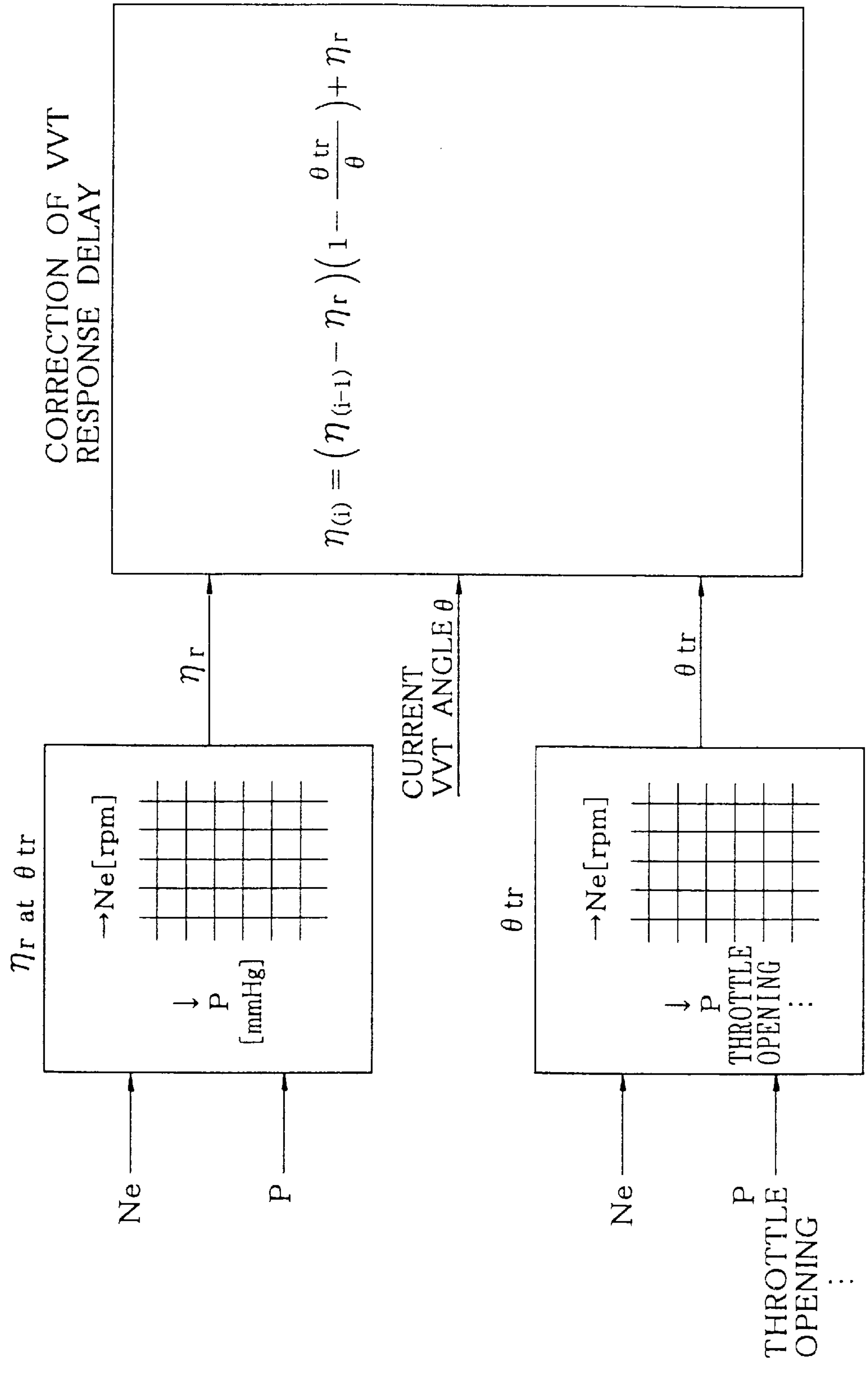
FIG. 12 is a block diagram showing a volumetric efficiency computation model.

In the present embodiment, calculation of the volumetric efficiency $\eta$ after compensation of the response delay of the variable valve timing mechanisms 28, 29 (VVT) from one volumetric efficiency calculation map is conducted as follows. As shown in FIG. 12, a map of its volumetric efficiency (basic volumetric efficiency) $\eta r$ is formed when the variable valve timing mechanisms 28, 29 are operated by natural consequence. Then, the map is stored in the ECU 30 so that the basic volumetric efficiency $\eta$ can be calculated in accordance with current engine speed Ne and the intake air pressure P. A VVT target angle $\theta tr$ corresponding to the current engine speed Ne and intake air pressure P (or the throttle angle) is calculated based on the map. By using the VVT target angle $\theta tr$, the current VVT angle $\theta$ and the basic volumetric efficiency $\eta r$, the volumetric efficiency $\eta$ is calculated from the following equation.

$$\eta_{(i)}=(\eta_{(i-1)}-\eta r)\cdot(1-\theta tr/\theta)+\eta r$$

where $\eta_{(i)}$ is a volumetric efficiency in question, and $\eta_{(i-1)}$ is a previous volumetric efficiency.

In a system having the variable valve timing mechanisms 28, 29 provided on both sides of the intake/exhaust as in the present embodiment, the variable valve timing mechanisms 28, 29 generates the same response delay. Therefore, for the current VVT angle $\theta$, an average value of a VVT angle on the intake side and a VVT angle of the exhaust side can be used.

$$\text{Current } VVT \text{ angle } \theta=(\text{intake side } VVT \text{ angle}+\text{exhaust side } VVT \text{ angle})/2$$

When the intra-cylindrical air amount $g_C$ is calculated by using the air amount calculation model in FIG. 2 as described above, and the output $g_{MAF}$ of the airflow meter 14 changes drastically, the intake air system model output (air amount inside cylinder $g_C$) may vibrate because of vibration of the output g of the response delay compensation element.

Figure 3:
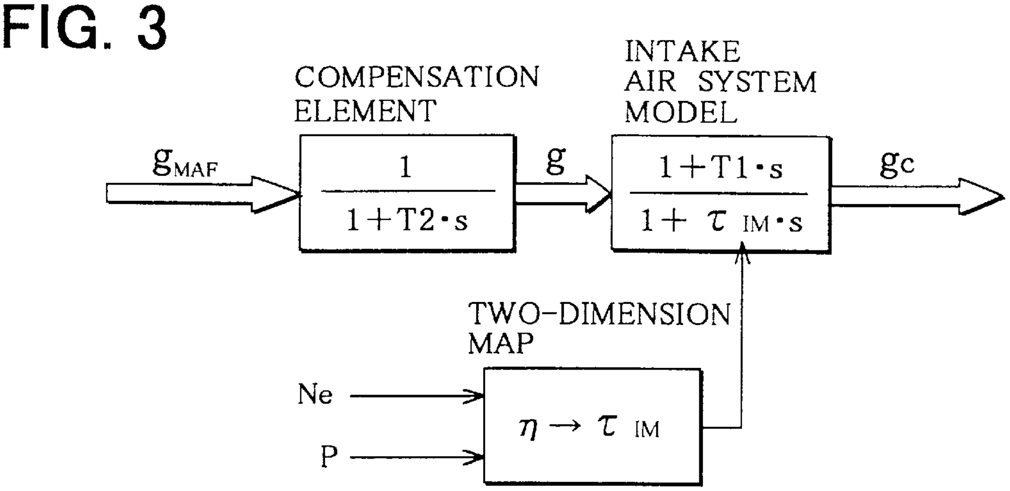
FIG. 3 is a block diagram showing the air amount inside cylinder calculation model.

In the present embodiment, as shown in FIG. 3, a term of the denominator of the transfer function of the response delay compensation element (phase advance compensation element) $(1+T_2\cdot s)$ and a term of the numerator thereof $(1+T_1\cdot s)$ are separated, and the term of the numerator $(1+T_1\cdot s)$ is incorporated in a term of the numerator of the transfer function of the intake air system model. Accordingly, the compensation element for compensating the output $g_{MAF}$ of the airflow meter 14 is expressed as the following equation (9):

$$g=1/(1+T_2\cdot s)\cdot g_{MAF} \tag{9}$$

The compensation element is a simple one dimensional delay element (low-pass filter), and thus, even if the drastic change occurs to the output $g_{MAF}$ of the airflow meter 14, the output g of the compensation element does not vibrate, thereby securing stability.

Moreover, by incorporating the term of the numerator of the response delay compensation element $(1+T_1\cdot s)$, the transfer function of the intake air system model is expressed as the following equation (10).

$$g_C=(1+T_1\cdot s)/(1+\tau_{IM}\cdot s)\cdot g \tag{10}$$

The transfer function of the intake air system model as expressed by the equation (10), the time constant of the term of the denominator $\tau_{IM}$ is much larger than the time constant of the term of the numerator. Thus, the output of the intake air system model (air amount $g_C$) does not vibrate during the transient period, thereby securing the stability.

In the present embodiment, by using the air amount inside cylinder calculation model as in FIG. 3, the air amount $g_C$ is calculated from the above-mentioned equations (9) and (10). Since the equations (9) and (10) are continuous equations, the continuous equations of (9) and (10) are separated by bilinear transformation for digital calculation by the ECU 30. Therefore, the equation (9) for expressing the compensation element is transformed to a discrete equation expressed by the following [1] equation so as to calculate the output g of the compensation element (low-pass filter) by using the discrete equation.

$$g_{(i)}=\frac{\Delta t}{\Delta t+2T_2}\cdot g_{MAF}-\frac{\Delta t-2T_2}{\Delta t+2T_2}\cdot g_{(i-1)} \quad [1]$$

where $g_{(i)}$ is a current value of g, $g_{(i-i)}$ is a previous value of g, and $\Delta t$ is a sampling time.

Further, the equation (10) for expressing the intake air system model is transformed by a discrete equation expressed by the following [2] equation, and the air amount inside cylinder $g_C$ as the output of the intake air system model is calculated by using the discrete equation.

$$g_{C(i)}=\frac{\Delta t+2T_1}{\Delta t+2\tau_{IM}}\cdot g_{(i)}+\frac{\Delta t-2\tau_{IM}}{\Delta t+2\tau_{IM}}\cdot g_{(i-1)}-\frac{\Delta t-2\tau_{IM}}{\Delta t+2\tau_{IM}}\cdot g_{C(i-1)}\ \text{[kg/sec]} \quad [2]$$

where $g_{C(i)}$ is a current value of $g_C$, and $g_{C(i-1)}$ is a previous value of $g_C$.

The ECU 30 executes each routine for controlling fuel injection as shown in FIGS. 4–11 so as to calculate the air amount $g_C$ by using the above-described discrete equations [1] and [2], thereby controlling the fuel injection amount. Hereinafter, processes of each routine will be described.

Main Routine

Figure 4:
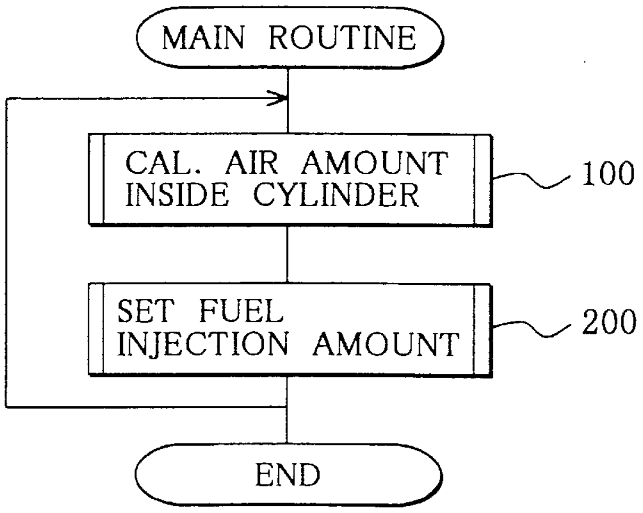
FIG. 4 is a flow chart showing a flow of a main routine process.

A main routine as shown in FIG. 4 is executed in a predetermined cycle after an ignition switch is turned on. When the present routine is activated, an air amount inside cylinder calculation routine in FIG. 5 as described later is executed at step 100 so as to calculate the air amount $g_C$ based on the output $g_{MAF}$ of the airflow meter 14. Thereafter, at step 200, the fuel injection amount setting routine (not illustrated) is executed to calculate the basic injection amount from a map or the like corresponding to the air amount inside cylinder $g_C$ and the engine speed. Then, the basic injection amount is multiplied by correction coefficients such as a fuel-air ratio feedback correction coefficient, a water temperature correction coefficients or the like to obtain a final fuel injection amount.

Air Amount Inside Cylinder Calculation

Figure 5:
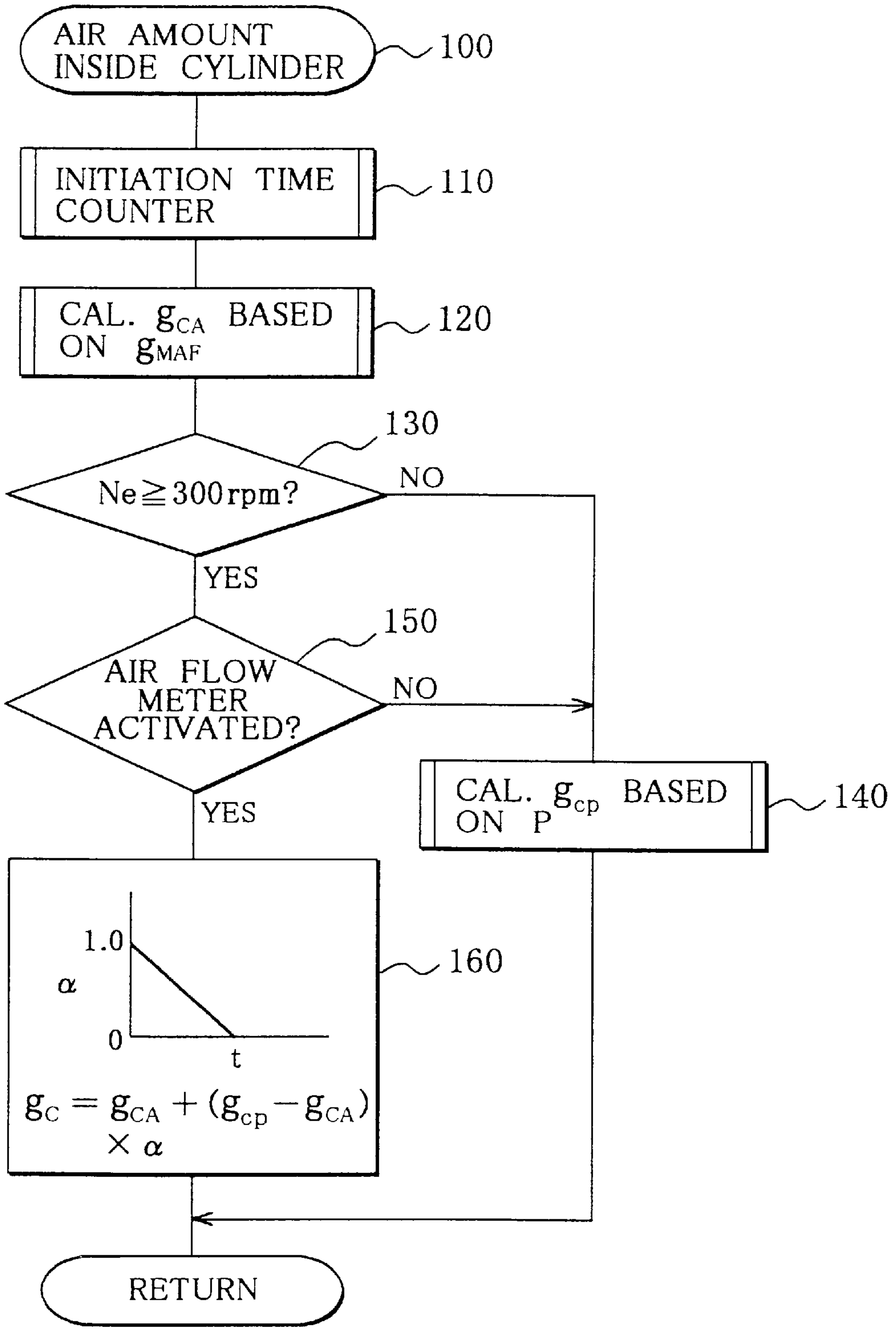
FIG. 5 is a flow chart showing a flow of processes of the air amount inside cylinder calculation routine.
Figure 6:
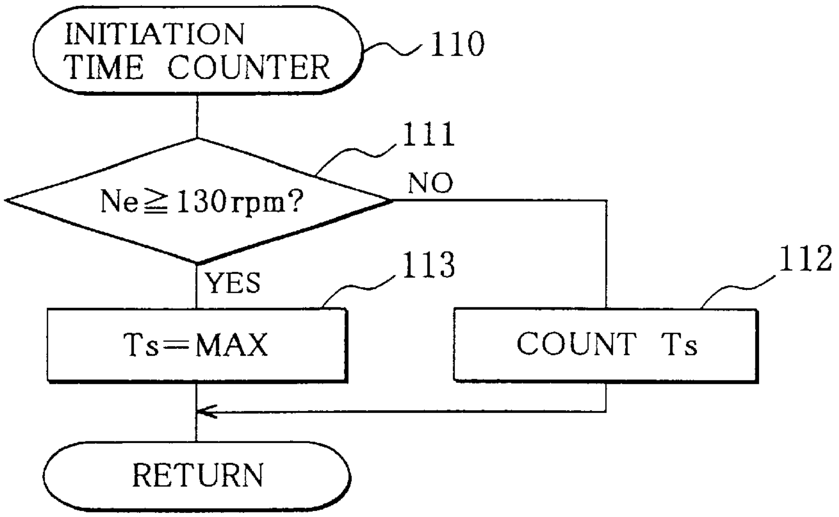
FIG. 6 is a flow chart showing a flow of a process of an activation time counter routine.

The air amount inside cylinder calculation routine as shown in FIG. 5 is a sub-routine executed in the step 100 of the main routine as shown in FIG. 4. When the present routine is activated, an initiation time counter routine in FIG. 6 is executed in step 110 to count the initiation time $T_S$. In the initiation time counter routine in FIG. 6, whether it is initiated or not is identified by examining whether the engine speed is above a predetermined value (300 rpm for example)

to determine whether the engine is initiated or not. If the engine is identified as not being initiated, it proceeds to step 112 to count elapsing time (initiation time) $T_S$ after the ignition switch is turned on. If it is identified as being initiated at step 111, then it proceeds to step 113 to set the initiation time $T_S$ to its maximum value (i.e., elapsing time from the ignition switch being turned on to initiation completion.)

Figure 7:
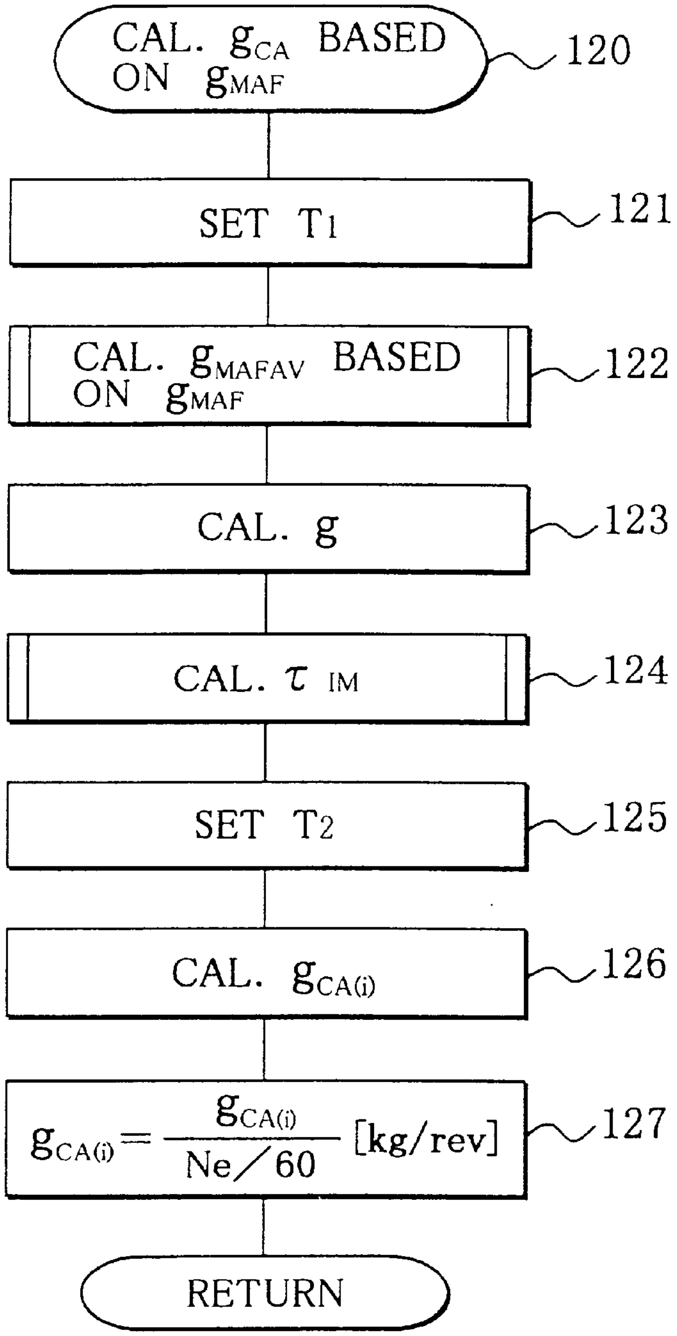
FIG. 7 is a flow chart showing a flow of a process of an air amount calculation routine based on an output of an airflow meter.
Figure 9:
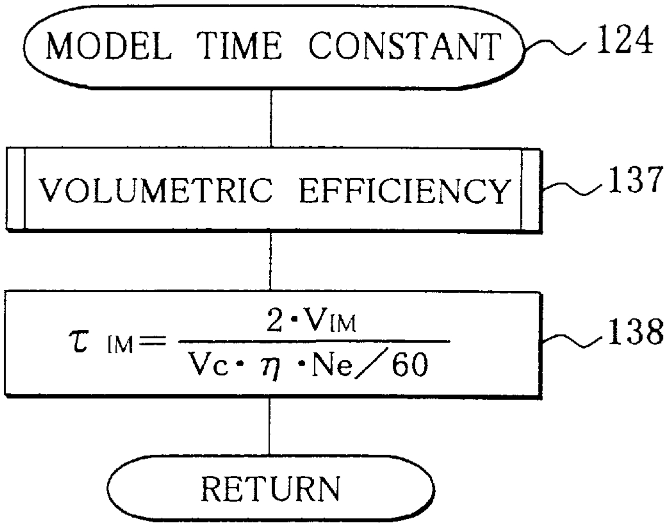
FIG. 9 is a flow chart showing a flow of a process of a mode time constant calculation routine.

After the initiation time counter routine in FIG. 6 is completed, it proceeds to step 120 as shown in FIG. 5 to execute the air amount inside cylinder calculation routine based on the airflow meter as shown in FIG. 7 so as to calculate an air amount inside cylinder $g_{CA}$ based on the output $g_{MAF}$ of the airflow meter 14. Thereafter, it proceeds to step 130 whether it is initiated or not is determined by examining whether the engine speed is above a predetermined value (300 rpm for example). If it is determined as not being initiated, it proceeds to step 140 to execute the air amount inside cylinder calculation routine based on an intake air pressure as shown in FIG. 9 so as to calculate the air amount inside cylinder $g_{CP}$ base on an output P of the intake air pressure sensor 18.

In step 130, if it is determined as being initiated, it proceeds to step 150 to determine whether or not the airflow meter is activated. The activation determination may be conducted by one of the following methods.

(1) The elapsing time (initiation time $T_S$) after the ignition switch being turned on is examined to determine whether a predetermined time ta required for the activation of the airflow meter 14 has been passed or not. If the predetermined time has not been passed, it is determined that the airflow meter 14 is not yet activated. If the predetermined time has been passed, on the other hand, it is determined that the airflow meter 14 is activated. In this case, the predetermined time ta may be a fixed value for simplifying the calculation process. Alternatively, it may be set by a map or the like corresponding to a cooling water temperature, an ambient temperature or the like.

(2) A margin of error between the air amount inside cylinder $g_{CA}$ calculated according to the output $g_{MAF}$ of the airflow meter 14 and the air amount inside cylinder $g_{CP}$ calculated according to the output P of the intake air pressure sensor 18 is examined to see if it is smaller than a set value. If the margin of error is greater than the set value, it is determined that the airflow meter 14 is activated. On the other hand, if the margin of error is smaller than the set value, it is determined that the airflow meter 14 is not activated.

When using the activation determining method as described in (1), if the predetermined time ta is set slightly longer to allow enough time, it is possible to avoid an event of misdetermination which determines a pre-activated airflow meter 14 as a an activated one. However, if the predetermined time ta becomes too long, a timing for determining the airflow meter 14 for activation is delayed, thus delaying a switching timing of the calculation method for the air amount inside cylinder.

Accordingly, in order to set the predetermined time ta at its required minimum as well as to avoid misdetermination of the activation determination, the airflow meter 14 may be determined as activated only when the above-described two conditions (1) and (2) are met, and otherwise, determined as it is not activated. By doing so, if the condition (2) is fulfilled at a time when the elapsing time (initiation time $T_S$) after the ignition switch being turned on reaches at the predetermined time ta set to its required minimum, the airflow meter can be determined as being activated so as to quickly switch the calculation method of the air amount inside cylinder while avoiding the misjudgment of the activation determination.

Figure 10:
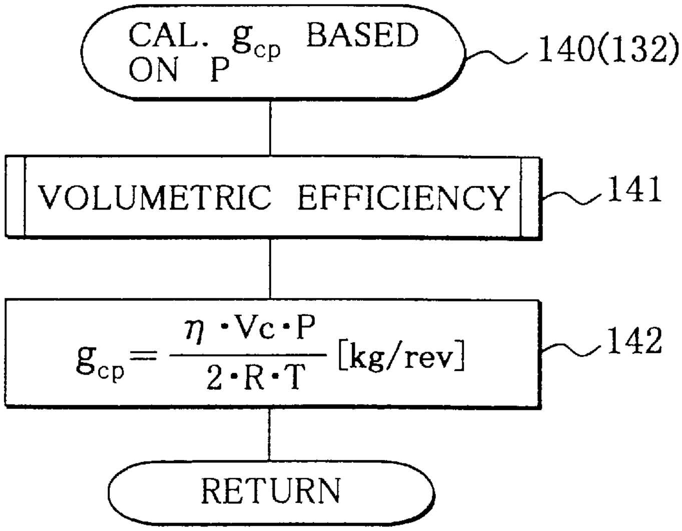
FIG. 10 is a flow chart showing a flow of process of the air amount inside cylinder calculation routine based on an intake air pressure.

In the above step 150, if the airflow meter 14 is determined as not being activated, it proceeds to step 140 to execute an air amount inside cylinder calculation routine based on the intake air pressure as shown in FIG. 10 as described later so as to calculate the air amount inside cylinder $g_{CP}$ in accordance with the output P of the intake air pressure sensor 18.

Thereafter, in step 150, if the airflow meter is determined as being activated, then it proceeds to step 160 so as to switch the calculation method of the air amount inside cylinder $g_C$ gradually from the calculation based on the output P of the intake air pressure sensor 18 to the calculation based on the output $g_{MAF}$ of the airflow meter 14 in accordance with the equation below.

$$g_C = g_{CA} + (g_{CP} - g_{CA}) \times \alpha$$

where $\alpha$ is a coefficient for switching the computation method for the intra-cylindrical air amount $g_C$ gradually, and is set by a map or the like corresponding to elapsing time after activation of the air flow meter 14 (after starting to switch the calculation method). In this case, immediately after the activation of the airflow meter 14 (i.e., during initial phase of starting to switch the calculation method), $\alpha$=1.0. Thereafter, as the time passes, $\alpha$ is becoming smaller until it becomes $\alpha$=0 after the predetermined time being passed. Thereafter, $\alpha$=0 is maintained. When $\alpha$=0, the air amount inside cylinder $g_{CA}$ calculated based on the output $g_{MAF}$ of the airflow meter 14 directly becomes a definitive air amount inside cylinder $g_C$.

Intra-Cylindrical Air Amount Calculation Routine Based on Airflow Meter Output The air amount inside cylinder calculation routine based on the airflow meter output as shown in FIG. 7 is a sub-routine which is executed in step 120 of the air amount inside cylinder calculation routine as shown in FIG. 5. When the present routine is activated, in step 121, a time constant $T_1$ of the term of the numerator of the phase advance compensation element is set by a map or the like based on at least one of the output $g_{MAF}$ of the airflow meter 14, the engine speed Ne, the intake air pressure P, and the throttle angle. The time constant $T_1$ may be a fixed to value to simplify the calculation process.

Figure 8:
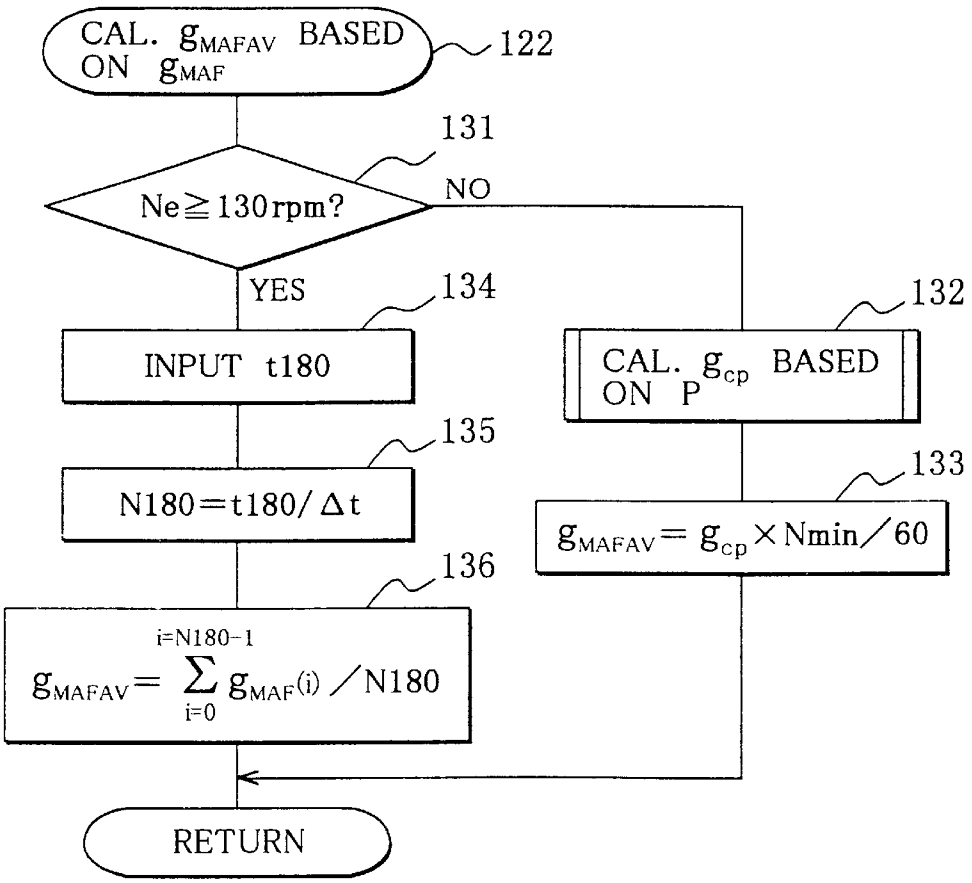
FIG. 8 is a flow chart showing a flow of a process of a cycle average process routine of a throttle passing air amount.

After the time constant $T_1$ is set, it proceeds to step 122. In step 122, a cycle average process routine for the throttle passing air amount as shown in FIG. 8 is executed as described later so as to calculate an average value $g_{MAFAV}$ of the throttle passing air amount during one cycle from the output $g_{MAF}$ of the thermal airflow meter 14. Thereafter, it proceeds to step 123, and an output $g_{(i)}$ of the calculation element (low-pass filter) by using the following equation [3].

$$g_{(i)} = \frac{\Delta t}{\Delta t + 2T_2} \cdot g_{MAFAV} - \frac{\Delta t - 2T_2}{\Delta t + 2T_2} \cdot g_{(i-1)} \quad [3]$$

Thereafter, it proceeds to step 124, and a model time constant calculation routine as shown in FIG. 9 is executed so as to calculate a model constant $\tau_{IM}$ of the intake air system model. Then, it proceeds to step 125, and a time constant $T_2$ of the term of the denominator of the phase advance compensation element is set by a map or the like based on at least one of the output $g_{MAF}$ of the airflow meter 14, the engine speed Ne, the intake air pressure P, and the throttle angle. The time constant $T_2$ may be a fixed value to simplify the calculation process.

Thereafter, it proceeds to step 126, and an air amount inside cylinder $g_{CA(i)}$, which is an output of the intake air system model, is calculated by using the following equation [4].

$$g_{CA(i)} = \frac{\Delta t + 2T_1}{\Delta t + 2\tau_{IM}} \cdot g_{(i)} + \frac{\Delta t - 2\tau_{IM}}{\Delta t + 2\tau_{IM}} \cdot g_{(i-1)} - \frac{\Delta t - 2\tau_{IM}}{\Delta t + 2\tau_{IM}} \cdot g_{C(i-1)} \text{ [kg/sec]} \quad [4]$$

A unit of the air amount inside cylinder $g_{CA(i)}$ calculated by Equation [4] is kg/sec (i.e., an intra-cylindrical air amount per unit time). Thus, in the next step 170, the unit of the amount inside cylinder $g_{CA(i)}$ is converted to kg/rev (i.e., air amount inside cylinder per engine rotation) by the following equation:

$$g_{CA(i)} = g_{CA(i)}/(Ne/60)[kg/rev].$$

Cycle Average Processing Routine for Throttle Passing Air Amount

The cycle average processing routine of the throttle passing air amount as shown in FIG. 8 is a sub-routine executed in step 122 of the routine as shown in FIG. 7. When the present routine is activated, in step 131, whether it has been activated or not is determined from whether or not the engine speed exceeds a predetermined value (e.g., 300 rpm). If the activation has been calculated, the air amount inside cylinder calculation routine based on the intake air pressure as shown in FIG. 10 is executed, and an air amount inside cylinder $g_{CP}$ based on the output P of the intake air pressure sensor 18 is calculated.

Thereafter, it proceeds to step 133, and from the air amount inside cylinder $g_{CP}$ calculated based on the output P of the intake air pressure sensor 18, the average value $g_{MAFAV}$ of the throttle passing air amount during one cycle is estimated based on the following equation:

$$g_{MAFAC} = g_{CP} \cdot Nmin/60[kg/sec]$$

where Nmin is a current engine speed, which is set to a fixed value (300 rpm, for example) because the engine speed is unstable before completion of activation.

On the contrary, if it is determined after being activated in step 131, it proceeds to step 134, and the time t180 of the one cycle of the output $g_{MAF}$ of the airflow meter is retrieved. The time t180 of one cycle is a time required for a four-cylinder engine to revolve 180° CA (Crank Angle).

Thereafter, it proceeds to step 135, and a sampling number N180 of one cycle is calculated from the next expression:

$$N180 = t180/\Delta t$$

where Δt is a sampling time.

Then, it proceeds to step 136, and the average value $g_{MAFAV}$ of the throttle passing air amount during one cycle is computed from the following equation:

$$g_{MAFAV} = \sum_{i=0}^{i=N180-1} g_{MAF(i)}/N180 \quad [5]$$

Model Time Constant Calculation Routine

Figure 11:
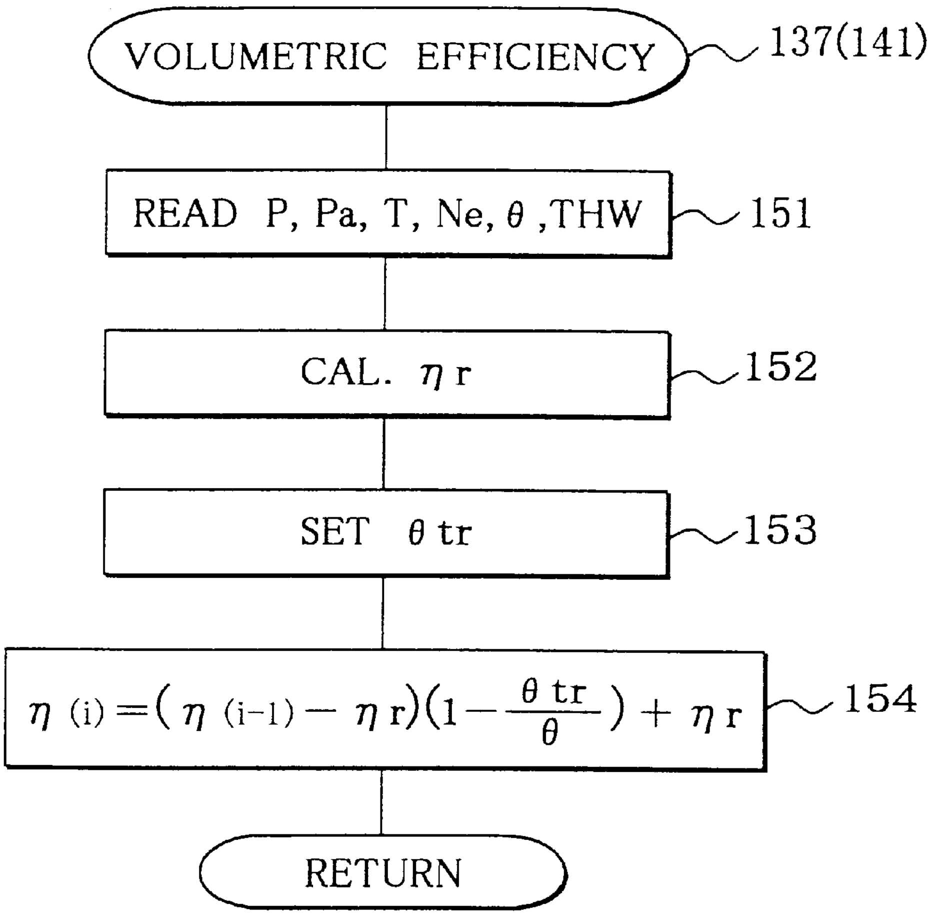
FIG. 11 is a flow chart showing a flow of a process of a volumetric efficiency calculation routine.

The model time constant calculating routine as shown in FIG. 9 is a sub-routine executed in step 124 of the routine as shown in FIG. 7. When the present routine is activated, in step 137, a volumetric efficiency calculation routine as shown in FIG. 11 as is executed to calculate the volumetric efficiency η. Then, it proceeds to step 138 to compute the model time constant $\tau_{IM}$ from the following equation:

$$\tau_{IM} = 2 \cdot V_{IM}/(V_C \cdot \eta Ne/60)$$

where $V_{IM}$ is an inside capacity of the throttle lower stream intake passageway (a fixed value), $V_C$ is a engine displacement (a fixed value) and Ne is an engine speed (rpm).

Air Amount Calculation Routine Based on Intake Air Pressure

The air amount inside cylinder calculation routine based on the intake air pressure as shown in FIG. 10 is a sub-routine executed in step 132 as shown in FIG. 8 and step 140 as shown in FIG. 5. When the present routine is activated, in step 141, the volumetric efficiency calculation routine as shown in FIG. 11 is executed to calculate the volumetric efficiency η. It proceeds to step 142 thereafter, and the air amount inside cylinder $g_{CP}$ based on the output (intake air pressure) P of the intake air pressure sensor 18 is calculated from the following equation:

$$g_{CP} = \eta \cdot V_C \cdot P/(2 \cdot R \cdot T)[kg/rev]$$

where $V_C$ is a engine displacement, R is a gas constant, and T is an intake air temperature.

Volumetric Efficiency Calculation Routine

The volumetric efficiency calculation routine as shown in FIG. 11 is a sub-routine executed in step 137 as shown in FIG. 9 and in step 140 as shown in FIG. 10. When the present routine is activated, in step 151, a current intake air pressure P, atmospheric pressure Pa, the intake air temperature T, the engine speed Ne, VVT angle θ (valve timing), and the cooling water temperature THW is read. Thereafter, it proceeds to step 152, and a map of the volumetric efficiency (basic volumetric efficiency) ηr obtained by operating the variable valve timing mechanisms 28, 29 naturally is searched so as to calculate the basic volumetric efficiency ηr corresponding to the current engine speed Ne and the intake air pressure P.

Then, it proceeds to step 153, and a map is searched for the VVT target angle θtr to calculate the VVT target angle θtr corresponding to the current engine speed Ne and the intake air pressure P. It proceeds to step 154 thereafter by using the VVT target angle θtr, the current VVT angle θ and the basic volumetric efficiency ηr at VCT target angle θtr, the volumetric efficiency η is calculated from the following equation.

$$\eta_{(i)} = (\eta_{(i-1)} - \eta r) \cdot (1 - \theta tr/\theta) + \eta r$$

where $\eta_{(i)}$ is a volumetric efficiency in question, and $\eta_{(i-1)}$ is a previous volumetric efficiency.

In a system having the variable valve timing mechanisms 28, 29 provided on both sides of the intake/exhaust as in the present embodiment, the variable valve timing mechanisms 28, 29 generates the same response delay. Therefore, for the current VVT angle θ, an average value of a VVT angle on the intake side and a VVT angle of the exhaust side can be used.

Current *VVT* angle θ=(intake side *VVT* angle+exhaust side *VVT* angle)/2

Figure 13:
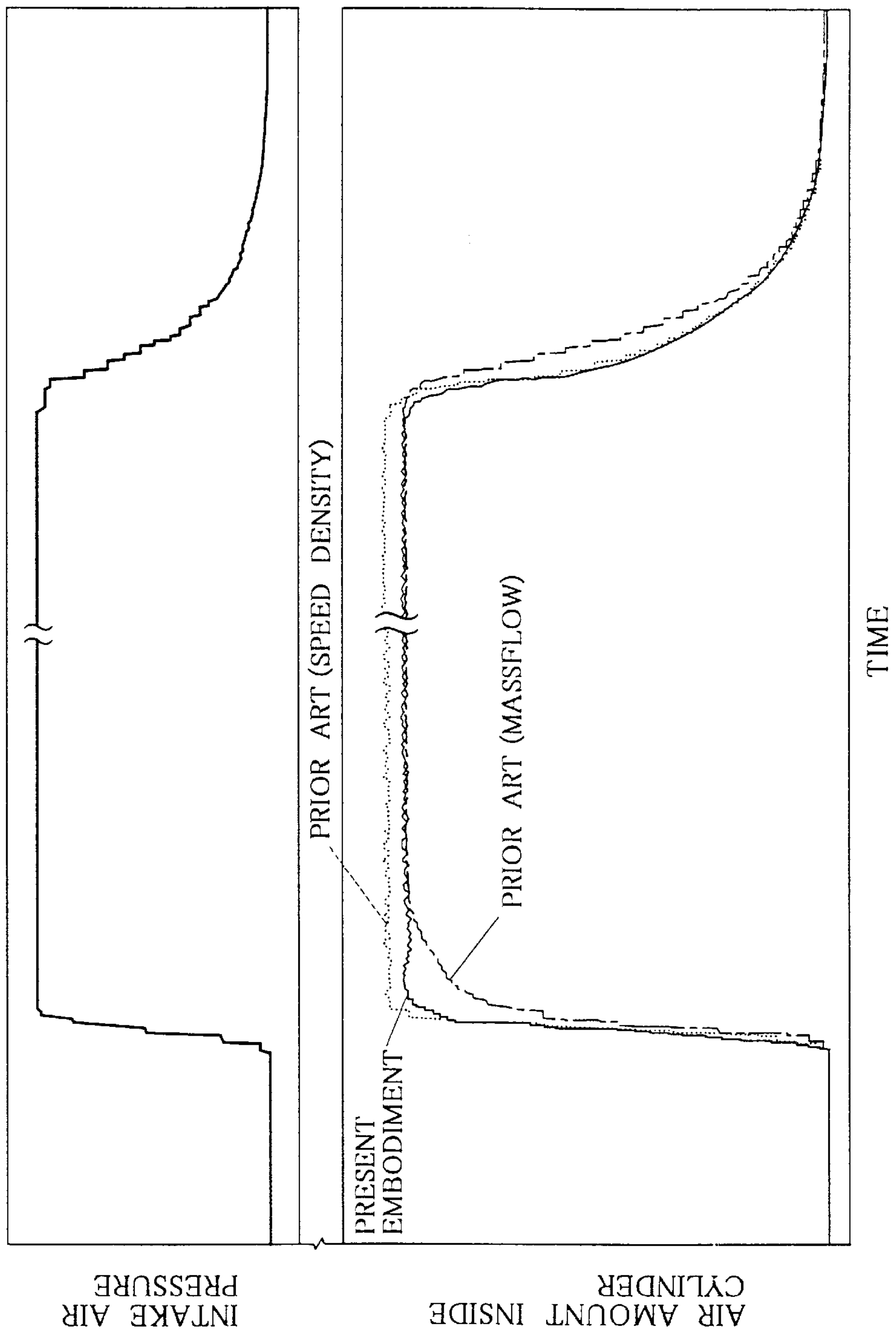
FIG. 13 is a time chart showing a behavior of detection values of the air amount inside cylinder during transient period and steady state.

FIG. 13 shows a time-chart illustrating one example of a behavior of the air amount inside cylinder calculated by each routine as shown in FIGS. 4–11 as described above. In the time chart in FIG. 13, as comparative examples, a conventional massflow method (where the air amount inside cylinder is calculated by the airflow meter output) and a conventional speed-density method (where the air amount inside cylinder is calculated by the intake air pressure sensor output) are also shown.

In the massflow method, the calculation accuracy of the air amount inside cylinder during the steady-state is desirable, but its response is undesirable during the transient period, and the calculation accuracy of the air amount inside cylinder during the transient period is undesirable. On the other hand, the speed-density method has an advantage of having desirable response during the transient period when compared to the massflow method. However, it has a disadvantage of having undesirable calculation accuracy of the air amount inside cylinder during the steady-state.

As opposed to the above, in the present embodiment, the air amount inside cylinder is calculated by compensating the response delay of the airflow meter 14 by the phase advance compensation. Thus, even though it is a method for calculating the air amount inside cylinder based on the output of the airflow meter, it can improve the response during the transient period, thereby improving the calculation accuracy of the air amount inside cylinder during the transient period. Moreover, it calculates the air amount inside cylinder from the output of the airflow meter 14. Thus, its calculation accuracy of the air amount inside cylinder during the steady-state is also desirable.

A sensor portion of the thermal airflow meter 14 includes a heat wire cooled by the intake air and a temperature detection element for detecting the intake air temperature. It has a structure which controls current supply to the heat wire to maintain the temperature difference between the heat wire and the intake air constant so as to detect the intake air flow amount by the current supply. Thus, at the time of activation, during a period from starting of current supply to the heat wire until the temperature difference between the heat wire and the intake air reaches at the certain value (i.e., during a period until the airflow meter 14 is activated), the intake air flow amount cannot be detected accurately.

In the present embodiment, at the time of activation, the air amount inside cylinder is calculated based on the output P of the intake air pressure sensor 18 (intake air pressure). Thereafter, at a time when the airflow meter 14 is estimated for its activation, the calculation method for the air amount inside cylinder is gradually switched to the calculation based on the output after the airflow meter 14 is compensated for its delay. In general, the intake air pressure sensor 18 detects a displacement of diaphragm by the intake air pressure. Therefore, it does not have a non-activated period at the time of activation like the airflow meter 14. Accordingly, as long as the air amount inside cylinder is calculated based on the output of the intake air pressure sensor 18 until the airflow meter 14 is activated at the time of activation, the air amount inside cylinder is detected even during the non-activation period of the airflow meter 14.

In the present embodiment, as shown in FIG. 12, a map of its volumetric efficiency (basic volumetric efficiency) ηr is formed when the variable valve timing mechanisms 28, 29 are operated by natural consequence. Accordingly, the basic volumetric efficiency ηr can be calculated according to current engine speed Ne and the intake air pressure P. By using the VVT target angle θtr, the current VVT angle θ and the basic volumetric efficiency ηr, the volumetric efficiency η is calculated by the equation. Therefore, it is possible to calculate the volumetric efficiency η which is compensated for the response delay of operation of the variable valve timing mechanisms 28, 29 from a single map. Thus, without preparing many maps for calculating the volumetric efficiency corresponding to each valve timing, one map corresponds to the valve timing. Accordingly, it is possible to reduce compatibility a process for preparing maps. At the same time, it is possible to reduce the memory space necessary for storing the map data.

In the present invention, a plurality of the calculation maps of the volumetric efficiency may be formed corresponding to the valve timing, while still achieving the object of the present invention sufficiently.

In the present embodiment, the model time constant $\tau_{IM}$ of the intake air system model is calculated by using the volumetric efficiency η calculated based on the engine speed Ne and the intake air pressure P and the engine speed Ne. Alternatively, relationships between the model time constant $\tau_{IM}$, the engine speed Ne, and the intake air pressure P may be mapped or mathematized in advance by experiment or simulation so as to directly calculate the model time constant $\tau_{IM}$ from the engine speed Ne and the intake air pressure P.

Moreover, as one of parameters for calculating the volumetric efficiency η, intake air pressure P/atmospheric pressure Pa may be used instead of the intake air pressure P. In this way, if the atmospheric pressure Pa changed due to altitude change during the mountain travel, the air amount inside cylinder can be calculated accurately without being influenced.

It should be understood that the present invention is not limited to be applicable to an engine with intake/exhaust variable valve timing mechanisms. It may be applied to an engine having the variable valve timing only on the intake side (or exhaust side), or an engine having no variable valve timing mechanism. Moreover, the present invention is not limited to an intake port injection engine, and it may be applied to the cylinder injection engine. An airflow meter (intake air flow detection means) is not limited to a thermal airflow meter, and vane airflow meter or Karman vortex airflow meter may be used.

What is claimed is:

1. An air amount inside cylinder detection apparatus for an internal combustion engine, comprising:

an intake air flow amount detection means for detecting a flow amount of intake air flowing through an intake air passageway;

a response delay compensation means for compensating a response delay of said intake air flow amount detection means; and a calculation means for calculating an air amount inside cylinder, wherein said calculation means uses an intake air system model modeling a behavior of the intake air passing through a throttle valve and flowing into cylinders, said intake air system model receives an output of said response delay compensation means so as to calculate an output of said intake air system model as the air amount inside cylinder.

2. An air amount inside cylinder detection apparatus according to claim 1, wherein said response delay compensation means compensates the response delay of said intake air flow amount detection means by a phase advance compensation.

3. An air amount inside cylinder detection apparatus according to claim 2, wherein said response delay compensation means sets a time constant of the phase advance compensation based on at least one of engine speed, an intake air pressure, a throttle angle, and the output of said intake air flow rate detection means.

4. An air amount detection apparatus according to claim 2, wherein a term of the denominator of a transfer function of the phase advance compensation is separated from a term of numerator thereof, and the term of the numerator is incorporated into a term of the denominator of the transfer function of the intake air system model.

5. An air amount detection apparatus according to claim 1, wherein said intake air flow amount detection means includes a thermal airflow meter, an intake air pressure detection means for detecting intake air pressure is provided within said intake air passageway, said calculation means calculates the air amount inside cylinder based on an output of said intake air pressure detection means at a time of engine start, and said calculation means calculates the air amount inside cylinder based on the output of said response delay compensation means when the air amount inside cylinder is estimated to be calculated accurately by activating said intake air flow amount detection means.

6. An air amount inside cylinder detection apparatus according to claim 1, wherein said calculation means sets a model time constant of the intake air system model based on engine speed and intake air pressure.

7. An air amount inside cylinder detection apparatus for according to claim 6, wherein said calculation means uses intake air pressure/atmospheric pressure instead of the intake air pressure as a parameter for calculating the volumetric efficiency or the model time constant.

8. An air amount inside cylinder detection apparatus according to claims 6, wherein a variable valve timing mechanism is provided for varying opening/closing timing at least one of an intake valve and an exhaust valve of the internal combustion engine, and said calculation means corrects the model time constant or the volumetric efficiency calculated based on the engine speed in accordance with the response delay of operation of said variable valve timing mechanism.

9. An air amount inside cylinder detection apparatus according to claim 1, wherein said calculation means calculates a volumetric efficiency based on engine speed and intake air pressure, and said calculation means sets a model time constant of the intake air system model based on the volumetric efficiency and the engine speed.

10. An apparatus for calculating an air amount charged in a cylinder of an engine, the apparatus comprising:

an airflow meter disposed upstream of a throttle valve in an intake passage leading intake air to the cylinder, the airflow meter outputting an output signal indicative of detected air amount;

first calculation means for calculating a compensated output signal by applying a compensation process to the output signal from the airflow meter, the compensation process being arranged to compensate for a response delay of the airflow meter; and second calculation means for calculating the air amount charged in the cylinder from the compensated output signal in the first calculation means based on an intake air system model which associates the compensated output signal and the air amount charged in the cylinder, the intake air system model modeling a behavior of the intake air flowing from downstream of the throttle valve to the cylinder.

11. A method for determining an amount of air in a cylinder of an internal combustion engine, comprising:

detecting an amount of intake air flowing through an intake air passageway;

determining a compensation value for a response delay of the detection of the intake air flow amount; and determining an air amount in a cylinder using an intake air system model modeling a behavior of the intake air passing through a throttle valve and flowing into the cylinders, wherein the air intake system model receives said compensation value to calculate an output of said intake air system model as the amount of air inside the cylinder.

12. A method according to claim 1, wherein said step of determining a compensation value is performed by advance phase compensation.

13. A method according to claim 1, further comprising:

detecting intake air pressure within said air intake passageway; and determining the amount of air inside the cylinder based on the detected intake air pressure at a time of engine start and the compensation value when the air amount inside the cylinder is estimated to be calculated accurately by detecting the amount of intake air flow.

14. A method according to claim 1, wherein said step of determining an amount of air in the cylinder includes correcting a model time constant or a volumetric efficiency calculated based on engine speed in accordance with a response delay of operation of a variable valve timing mechanism.

15. A method according to claim 1, wherein said step of determining an amount of air in the cylinder includes calculating a volumetric efficiency base on engine speed and intake air pressure, and setting a model time constant of the intake air system model based on the volumetric efficiency and the engine speed.

* * * * *